United States Patent
Dewachter et al.

(10) Patent No.: US 9,631,077 B2
(45) Date of Patent: *Apr. 25, 2017

(54) PROCESS FOR PREPARING ZIEGLER-NATTA PRODUCED POLYETHYLENE BLENDS

(71) Applicant: TOTAL RESEARCH & TECHNOLOGY FELUY, Seneffe (BE)

(72) Inventors: Daan Dewachter, Mechelen (BE); Eric Damme, Arquenness (BE)

(73) Assignee: Total Research & Technology Feluy, Seneffe (BE)

( * ) Notice: Subject to any disclaimer, the term of this patent is extended or adjusted under 35 U.S.C. 154(b) by 0 days.

This patent is subject to a terminal disclaimer.

(21) Appl. No.: 14/753,046

(22) Filed: Jun. 29, 2015

(65) Prior Publication Data

US 2015/0299441 A1 Oct. 22, 2015

Related U.S. Application Data

(63) Continuation of application No. 14/003,214, filed as application No. PCT/EP2012/053654 on Mar. 2, 2012, now Pat. No. 9,109,105.

(30) Foreign Application Priority Data

Mar. 4, 2011 (EP) .................................... 11157059

(51) Int. Cl.
*C08L 23/00* (2006.01)
*C08L 23/06* (2006.01)
*C08L 23/08* (2006.01)

(52) U.S. Cl.
CPC ............ *C08L 23/06* (2013.01); *C08L 23/0815* (2013.01); C08L 2205/025 (2013.01); C08L 2207/062 (2013.01); C08L 2308/00 (2013.01); C08L 2314/02 (2013.01)

(58) Field of Classification Search
CPC ................. C08L 23/06; C08L 23/0815; C08L 2207/062; C08L 2308/00; C08L 2205/025; C08L 2314/02; C08L 2666/06
See application file for complete search history.

(56) References Cited

U.S. PATENT DOCUMENTS

| | | | |
|---|---|---|---|
| 5,106,804 A | 4/1992 | Bailly et al. | |
| 5,153,158 A | 10/1992 | Kioka et al. | |
| 5,594,071 A | 1/1997 | Takahashi et al. | |
| 6,864,207 B2 | 3/2005 | Knoeppel et al. | |
| 8,609,792 B2* | 12/2013 | Vantomme et al. | .... C08F 10/00 526/125.1 |
| 9,109,105 B2* | 8/2015 | Dewachter et al. | .... C08L 23/06 |

* cited by examiner

*Primary Examiner* — Nathan M Nutter
(74) *Attorney, Agent, or Firm* — Albert Shung

(57) ABSTRACT

A process for preparing a multimodal polyethylene product with at least two different polyethylene resins includes producing a first polyethylene resin in the presence of a Ziegler-Natta catalyst in a reactor. The Ziegler-Natta catalyst used for the production of the first polyethylene resin has an average particle size (D50) of at most 15 µm. The process includes separately producing a second polyethylene resin in the presence of a Ziegler-Natta catalyst in a reactor. The process includes physically blending together the first and second polyethylene resins to produce a multimodal polyethylene product.

16 Claims, No Drawings

PROCESS FOR PREPARING ZIEGLER-NATTA PRODUCED POLYETHYLENE BLENDS

This application is a Continuation of U.S. patent application Ser. No. 14/003,214, filed on Sep. 4, 2013, which is a National Stage Entry of PCT/EP2012/053654, filed on Mar. 2, 2012, which claims priority from EP 11157059.4, filed on Mar. 4, 2011.

TECHNICAL FIELD OF THE INVENTION

The present invention relates to a process for preparing a multimodal polyethylene product. The invention can advantageously be used in chemical manufacturing, specifically in the polymerization of olefins, particularly ethylene (PE).

BACKGROUND OF THE INVENTION

Polyolefins, such as polyethylene (PE), are synthesized by polymerizing monomers, such as ethylene ($CH_2=CH_2$). Because it is cheap, safe, stable to most environments and easy to be processed polyolefins are useful in many applications. Polyethylene can be classified into several types, such as but not limited to LDPE (Low Density Polyethylene), LLDPE (Linear Low Density Polyethylene), and HDPE (High Density Polyethylene) as well as High Molecular Weight (HMW), Medium Molecular Weight (MMW) and Low Molecular Weight (LMW). Each type of polyethylene has different properties and characteristics.

Olefin (such as ethylene) polymerizations are frequently carried out in a loop reactor using monomer (such as ethylene), diluent and catalyst, optionally an activating agent, optionally one or more co-monomer(s), and optionally hydrogen.

Polymerization in a loop reactor is usually performed under slurry conditions, with the produced polymer usually in a form of solid particles suspended in diluent. The slurry is circulated continuously in the reactor with a pump to maintain efficient suspension of the polymer solid particles in the liquid diluent. Polymer slurry is discharged from the loop reactor by means of settling legs, which operate on a batch principle to recover the slurry. Settling in the legs is used to increase the solid concentration of the slurry finally recovered as product slurry. The product slurry is further discharged through heated flash lines to a flash tank, where most of the diluent and unreacted monomers are flashed off and recycled.

After the polymer product is collected from the reactor and the hydrocarbon residues are removed, the polymer product is dried resulting in a polymer resin. Additives can be added and finally the polymer may be mixed and pelletized resulting in polymer product.

During the mixing step, polymer resin and optional additives are mixed intimately in order to obtain a polymer product as homogeneous as possible. Preferably, mixing is done in an extruder wherein the ingredients are mixed together and the polymer product and optionally some of the additives are melted so that intimate mixing can occur. The melt is then extruded into a rod, cooled and granulated, e.g. to form pellets. In this form the resulting compound can then be used for the manufacturing of different objects. Two or more different polyethylene resins can be produced separately and subsequently mixed, representing a physical blending process.

However, complications may occur during physical blending of different polyolefin resins into a multimodal polymer product, particularly when one of the resins has a High Molecular Weight (HMW). Even though such blends could be advantageous in usage, the complications related to physical blending may require complicated mixing machines and/or extensive mixing processes or even lead to non-homogenous polymer mixtures that are not optimal for application in end-products. Consequently, there remains a need in the art for homogeneous polymer product. In particular there remain a need in the art for homogeneous polymer product produced from High Molecular Weight (HMW) polyethylene resin while ensuring low production costs and high-quality end-products.

SUMMARY OF THE INVENTION

Surprisingly, the present inventors have found a way to improve polyolefin preparation processes and overcome at least one of the above and other problems of the prior art. Accordingly, the present invention relates to a process for preparing a multimodal polyethylene product, said product comprising at least two different polyethylene resins, the process comprising the steps of:
 (a) producing a first HMW polyethylene resin in the presence of a Ziegler-Natta catalyst in a reactor;
 (b) separately producing a second LMW polyethylene resin in the presence of a Ziegler-Natta catalyst in a reactor; and
 (c) physically blending together said first and said second polyethylene resin to produce a multimodal polyethylene product,
wherein the Ziegler-Natta catalyst used for the production of said first polyethylene resin has an average particle diameter (D50) of at most 15 µm.

Preferably, the present process relates to a process for preparing a multimodal polyethylene product, said product comprising at least two different polyethylene resins, the process comprising the steps of:
 (a) producing a first HMW polyethylene resin in the presence of a Ziegler-Natta catalyst in a reactor, wherein the High Load Melt Index (HLMI) of said first polyethylene resin is between 0.01 and 5 g/10 min, with the High Load Melt Index (HLMI) being measured by the procedure of ASTM D-1238 using a temperature of 190° C. and a load of 21.6 kg;
 (b) separately producing a second LMW polyethylene resin in the presence of a Ziegler-Natta catalyst in a reactor, wherein the Melt Index ($MI_2$) of said second polyethylene resin is between 1 and 150 g/10 min, with the Melt Index $MI_2$ being measured by the procedure of ASTM D-1238 using a temperature of 190° C. and a load of 2.16 kg; and
 (c) physically blending together said first and said second polyethylene resin to produce a multimodal polyethylene product,
wherein the Ziegler-Natta catalyst used for the production of said first polyethylene resin has an average particle size (D50) of at most 15 µm, with the D50 being measured by laser diffraction analysis on a Malvern type analyzer, and wherein step (c) is performed in device for continuously melting and blending said first and second polyethylene resin.

Surprisingly, the present invention leads to better controlled process conditions, homogeneous multimodal polyethylene products and/or more optimal end-products.

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

DETAILED DESCRIPTION OF INVENTION

Before the present method used in the invention is described, it is to be understood that this invention is not limited to particular methods, components, or devices described, as such methods, components, and devices may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of".

The recitation of numerical ranges by endpoints includes all numbers and fractions subsumed within the respective ranges, as well as the recited endpoints.

The term "about" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

The present invention relates to physical blending of at least two different polyethylene resins into a multimodal polyethylene product; i.e. a polyethylene product with a multimodal molecular weight distribution. Both resins are produced separately, preferably in separate loop reactors, which are preferably single loop reactors.

For the purpose of this invention, "fluff" is defined as the polymer material that is produced in the loop reactor with the hard catalyst particle at the core of each grain of the powder.

As used herein the term "resin" encompasses both the fluff produced in the loop reactor as well as the subsequently melted and/or pelleted polyethylene.

For the purpose of the invention, "polyethylene product" or "polyethylene pellet" is defined as ethylene polymer material that is produced through compounding and homogenizing of the resin, for instance with mixing and/or extruder equipment.

By the term "monomodal polymers" or "polymers with a monomodal molecular weight distribution" it is meant, polymers having one maxima in their molecular weight distribution curve defined also as unimodal distribution curve. By the term "polymers with a bimodal molecular weight distribution" or "bimodal polymers" it is meant, polymers having a distribution curve being the sum of two unimodal molecular weight distribution curves. By the term "polymers with a multimodal molecular weight distribution" or "multimodal" polymers it is meant polymers with a distribution curve being the sum of at least two, preferably more than two unimodal distribution curves. By the term "monomodal polyethylene" or "polyethylene with a monomodal molecular weight distribution" it is meant, polyethylene having one maxima in their molecular weight distribution curve defined also as unimodal distribution curve. By the term "polyethylene with a multimodal molecular weight distribution" or "multimodal" polyethylene product it is meant polyethylene with a distribution curve being the sum of at least two, preferably more than two unimodal distribution curves.

Surprisingly, the present inventors have found that producing the first HMW polyethylene resin in the presence of small Ziegler-Natta catalyst particles allows for physical blending of resulting resin with another resin into a homogeneous multimodal polyethylene product. Preferably, the first polyethylene resin is produced in the presence of a Ziegler-Natta catalyst with an average particle size (050) of at most 15 μm, more preferably at most 13 μm, most preferably at most 10 μm, most preferably at most 8 μm, for example at most 5 μm and preferably at least 3 μm.

The D50 is defined as the particle size for which fifty percent by volume of the particles has a size lower than the D50. The measurement of the average particle size (D50) can be made according to the International Standard ISO 13320:2009 ("Particle size analysis—Laser diffraction methods"). For example, Malvern Instruments' laser diffraction systems can advantageously be used. The D50 can be measured by laser diffraction analysis on a Malvern type analyzer after having put the supported catalyst in suspension in cyclohexane. Suitable Malvern systems include the Malvern 2000, Malvern MasterSizer (such as Mastersizer S), Malvern 2600 and Malvern 3600 series. Such instruments together with their operating manual meet or even exceed the requirements set-out within the ISO 13320 Standard. The Malvern MasterSizer (such as Mastersizer S) may also be useful as it can more accurately measure the D50 towards the lower end of the range e.g. for average particle sizes of less 8 μm, by applying the theory of Mie, using appropriate optical means.

Preferably, the first polyethylene resin has a High Molecular Weight (HMW). Preferably, said first polyethylene resin has a High Load Melt Index (HLMI), measured at 190° C. under a 21.6 kg load according ASTM D-1238, of 0.01 to 5 g/10 min. Preferably, the density of said first polyethylene resin is between 0.915 and 0.940 g/cm³ with the density being determined with the ASTM D-1505 standardized test at a temperature of 23° C. Preferably, the first polyethylene resin has a monomodal molecular weight distribution.

The second polyethylene resin is produced in the presence of a Ziegler-Natta catalyst. Preferably, the second resin has a Low Molecular Weight (LMW). Preferably, said second polyethylene resin has a Melt Index ($MI_2$), measured at 190° C. under a 2.16 kg load according ASTM D-1238, of 1 to 150 g/10 min. Preferably, the density of said second polyethylene resin is between 0.940 and 0.975 g/cm³ with the density being determined with the ASTM D-1505 standardized test at a temperature of 23° C. Preferably, the second polyethylene resin has a monomodal molecular weight distribution.

According to the invention, the HLMI is determined with the ASTM D-1238 standardized test which uses a temperature of 190° C. and a load of 21.6 kg. The $MI_2$ is determined with the ASTM D-1238 standardized test which uses a temperature of 190° C. and a load of 2.16 kg. The density is determined with the ASTM D-1505 standardized test at a temperature of 23° C.

Preferably, the multimodal polyethylene product of the invention has an HLMI of between 2 and 75 g/10 min. Preferably, the density of said multimodal polyethylene product is between 0.935 and 0.965 g/cm³. Preferably, the multimodal polyethylene product has a bimodal distribution.

Preferably, the weight ratio of said first polyethylene resin to said second polyethylene resin in said multimodal polyethylene product is between 0.20 and 5. Preferably, the multimodal polyethylene product comprises at least 10%, more preferably, at least 25%, most preferably at least 40% and at most 90%, more preferably at most 75%, most preferably at most 60% by weight of the first polyethylene resin, based on the total weight of the polyethylene product. Preferably, the multimodal polyethylene product comprises at least 10%, more preferably, at least 25%, most preferably at least 40% and at most 90%, more preferably at most 75%, most preferably at most 60% by weight of the second polyethylene resin, based on the total weight of the polyethylene product. Preferably, the multimodal polyethylene product comprises at least 10%, more preferably, at least 25%, most preferably at least 40% and at most 90%, more preferably at most 75%, most preferably at most 60% by weight of the first polyethylene resin, and at least 10%, more preferably, at least 25%, most preferably at least 40% and at most 90%, more preferably at most 75%, most preferably at most 60% by weight of the second polyethylene resin, based on the total weight of the polyethylene product.

Preferably, the at least two polyethylene resins are physically blended in a device for continuously melting and blending said resins. Said device can be selected from a mixer, an extruder or combinations thereof. Preferably, the device is an extruder. A preferred extruder is a co-rotating twin screw. A preferred mixer is a counter-rotating twin screw.

The present invention encompasses a step for preparing polyolefin resin. Polyolefin, and in particular polyethylene, resins are preferably prepared, in a reactor, either in gas phase or in slurry condition. Preferably, said polyolefin is prepared in slurry conditions. More preferably said polyolefin is produced in a loop reactor that preferably comprises interconnected pipes, defining a reactor path, and wherein a slurry is preferably pumped through said loop reactor. Preferably, each of the polyethylene resins is separately produced in a single loop reactor.

As used herein, the term "polymerization slurry" or "polymer slurry" or "slurry" means substantially a multiphase composition including at least polymer solids and a liquid phase, the liquid phase being the continuous phase. The solids include catalyst and a polymerized olefin, such as polyethylene. The liquids include an inert diluent, such as isobutane, dissolved monomer such as ethylene, co-monomer, molecular weight control agents, such as hydrogen, antistatic agents, antifouling agents, scavengers, and other process additives.

As used herein, the term "catalyst" refers to a substance that causes a change in the rate of a polymerization reaction. In the present invention, it is especially applicable to catalysts suitable for the polymerization of ethylene to polyethylene. These catalysts will be referred to as ethylene polymerization catalysts or polymerization catalysts. The present invention especially relates to Ziegler-Natta catalysts. The term "Ziegler-Natta catalyst" or "ZN catalyst" refers to catalysts having a general formula $M^1X_v$, wherein $M^1$ is a transition metal compound selected from group IV to VII, wherein X is a halogen, and wherein v is the valence of the metal. Preferably, $M^1$ is a group IV, group V or group VI metal, more preferably titanium, chromium or vanadium and most preferably titanium. Preferably, X is chlorine or bromine, and most preferably, chlorine. Illustrative examples of the transition metal compounds comprise but are not limited to $TiCl_3$, $TiCl_4$. Suitable ZN catalysts for use in the invention are described in U.S. Pat. No. 6,930,071 and U.S. Pat. No. 6,864,207, which are incorporated herein by reference.

Particularly preferred catalyst for use in the present invention, especially for production of the first polyethylene resin, is a Ziegler-Natta catalyst system comprising a Ziegler-Natta catalyst component D and a preactivating agent, wherein the Ziegler Natta catalyst component D is obtainable by:
  a) generating a reaction product A by contacting a magnesium dialkoxide compound with a halogenating agent;
  b) contacting reaction product A with a first halogenating/titanating agent to form reaction product B;
  c) contacting reaction product B with a second halogenating/titanating agent to form reaction product C; and
  d) contacting reaction product C with a third halogenating/titanating agent to form catalyst component D.

Preferably the catalyst is made according to a process comprising the following steps: a) contacting a magnesium dialkoxide compound with a halogenating agent to form a reaction product A; b) contacting reaction product A with a first halogenating/titanating agent to form reaction product B; c) contacting reaction product B with a second halogenating/titanating agent to form reaction product C; and d) contacting reaction product C with a third halogenating/titanating agent to form reaction product D. The second and third halogenating/titanating agents can comprise titanium tetrachloride. The second and third halogenating/titanating steps can each comprise a titanium to magnesium ratio in the range of about 0.1 to 5. The reaction products A, B and C can each be washed with a hydrocarbon solvent prior to subsequent halogenating/titanating steps. The reaction product D can be washed with a hydrocarbon solvent until titanium species [Ti] content is less than about 100 mmol/L.

In an embodiment, a method for making a catalyst component generally includes the steps of forming a metal dialkoxide from a metal dialkyl and an alcohol, halogenating the metal dialkoxide to form a reaction product, contacting the reaction product with one or more halogenating/titanating agent in three or more steps to form a catalyst component, and then treating the catalyst component with a preactivation agent such as an organoaluminum.

One embodiment of the method for making a catalyst can be generally as follows:

   1.

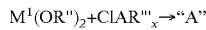   2.

   3.

   4.

   5.

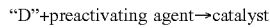   6.

In the above formulas, $M^1$ can be any suitable metal, usually a Group IIA metal, typically Mg. In the above formulas, R, R', R", R''', and R"" are each independently hydrocarbyl or substituted hydrocarbyl moieties, with R and R' having from 1 to 20 carbon atoms, generally from 1 to 10 carbon atoms, typically from 2 to 6 carbon atoms, and can have from 2 to 4 carbon atoms. R" generally comprises from 3 to 20 carbon atoms, R''' generally comprises from 2-6 carbon atoms, and R"" generally comprises from 2-6 carbon atoms and is typically butyl. Any combination of two or more of R, R', R", R''', and R"" can be used, may be the same, or the combination of the R groups may be different from one another.

In the above embodiment comprising formula $ClAR'''_x$, A is a nonreducing oxyphilic compound which is capable of exchanging one chloride for an alkoxide, R''' is a hydrocarbyl or substituted hydrocarbyl, and x is the valence of A minus 1. Examples of A include titanium, silicon, aluminum, carbon, tin and germanium, typically is titanium or silicon wherein x is 3. Examples of R''' include methyl, ethyl, propyl, isopropyl and the like having 2-6 carbon atoms. No limiting examples of a chlorinating agent that can be used in the method are $ClTi(O^iPr)_3$ and $ClSi(Me)_3$.

The metal dialkoxide of the above embodiment is chlorinated to form a reaction product "A". While the exact composition of product "A" is unknown, it is believed that it contains a partially chlorinated metal compound, one example of which may be ClMg(OR").

Reaction product "A" is then contacted with one or more halogenating/titanating agent, such as for example a combination of $TiCl_4$ and $Ti(OBu)_4$, to form reaction product "B". Reaction product "B" which is probably a complex of chlorinated and partially chlorinated metal and titanium compounds. Reaction product "B" can comprise a titanium impregnated $MgCl_2$ support and for example, may possibly be represented by a compound such as $(MCl_2)_y (TiCl_x (OR)_{4-x})_z$. Reaction product "B" can be precipitated as a solid from the catalyst slurry.

The second halogenation/titanation step produces reaction product, or catalyst component, "C" which is also probably a complex of halogenated and partially halogenated metal and titanium compounds but different from "B" and may possibly be represented by $(MCl_2)_y (TiCl_{x'}(OR)_{4-x'})_{z'}$. It is expected that the level of halogenation of "C" would be greater than that of product "B". This greater level of halogenation can produce a different complex of compounds.

The third halogenation/titanation step produces a reaction product, or catalyst component, "D" which is also probably a complex of halogenated and partially halogenated metal and titanium compounds but different from "B" and "C", and may possibly be represented by $(MCl_2)_y (TiCl_{x''}(OR)_{4-x''})_{z''}$. It is expected that the level of halogenation of "D" would be greater than that of product "C". This greater level of halogenation would produce a different complex of compounds. While this description of the reaction products offers the most probable explanation of the chemistry at this time, the method is not limited by this theoretical mechanism.

Metal dialkyls and the resultant metal dialkoxides suitable for use in the method can include any that can be utilized in the method to yield a suitable polyolefin catalyst. These metal dialkoxides and dialkyls can include Group IIA metal dialkoxides and dialkyls. The metal dialkoxide or dialkyl can be a magnesium dialkoxide or dialkyl. Non-limiting examples of suitable magnesium dialkyls include diethyl magnesium, dipropyl magnesium, dibutyl magnesium, butylethylmagnesium, etc. Butylethylmagnesium (BEM) is one suitable magnesiumdialkyl.

In the practice of the method, the metal dialkoxide can be a magnesium compound of the general formula $Mg(OR")_2$ where R" is a hydrocarbyl or substituted hydrocarbyl of 1 to 20 carbon atoms.

The metal dialkoxide can be soluble and is typically non-reducing. A non-reducing compound has the advantage of forming $MgCl_2$ instead of insoluble species that can be formed by the reduction of compounds such as MgRR', which can result in the formation of catalysts having a broad particle size distribution. In addition, $Mg(OR")_2$, which is less reactive than MgRR', when used in a reaction involving chlorination with a mild chlorinating agent, followed by subsequent halogenation/titanation steps, can result in a more uniform product, e.g., better catalyst particle size control and distribution.

Non-limiting examples of species of metal dialkoxides which can be used include magnesium butoxide, magnesium pentoxide, magnesium hexoxide, magnesium di(2-ethylhexoxide), and any alkoxide suitable for making the system soluble.

As a non-limiting example, magnesium dialkoxide, such as magnesium di (2-ethylhexoxide), may be produced by reacting an alkyl magnesium compound (MgRR') with an alcohol (ROH), as shown below, MgRR'+2R"OH→Mg(OR")$_2$+RH+R'H The reaction can take place at room temperature and the reactants form a solution. R and R' may each be any alkyl group of 1-10 carbon atoms, and may be the same or different. Suitable MgRR' compounds include, for example, diethyl magnesium, dipropyl magnesium, dibutyl magnesium and butyl ethyl magnesium. The MgRR' compound can be BEM, wherein RH and R'H are butane and ethane, respectively.

In the practice of the method, any alcohol yielding the desired metal dialkoxide may be utilized. Generally, the alcohol utilized may be any alcohol of the general formula R"OH where R" is an alkyl group of 2-20 carbon atoms, the carbon atoms can be at least 3, at least 4, at least 5, or at least 6 carbon atoms. Non-limiting examples of suitable alcohols include ethanol, propanol, isopropanol, butanol, isobutanol, 2-methyl-pentanol, 2-ethylhexanol, etc. While it is believed that almost any alcohol may be utilized, linear or branched, a higher order branched alcohol, for example, 2-ethyl-1-hexanol, can be utilized.

The amount of alcohol added can vary, such as within a non-exclusive range of 0 to 10 equivalents, is generally in the range of about 0.5 equivalents to about 6 equivalents (equivalents are relative to the magnesium or metal compound throughout), and can be in the range of about 1 to about 3 equivalents.

Alkyl metal compounds can result in a high molecular weight species that is very viscous in solution. This high viscosity may be reduced by adding to the reaction an aluminum alkyl such as, for example, triethylaluminum (TEN), which can disrupt the association between the individual alkyl metal molecules. The typical ratio of alkyl aluminum to metal can range from 0.001:1 to 1:1, can be 0.01 to 0.5:1 and also can range from 0.03:1 to 0.2:1. In addition, an electron donor such as an ether, for example, diisoamyl ether (DIAE), may be used to further reduce the viscosity of the alkyl metal. The typical ratio of electron donor to metal ranges from 0:1 to 10:1 and can range from 0.1:1 to 1:1.

Agents useful in the step of halogenating the metal alkoxide include any halogenating agent which when utilized in the method will yield a suitable polyolefin catalyst. The halogenating step can be a chlorinating step where the halogenating agent contains a chloride (i.e, is a chlorinating agent).

Halogenating of the metal alkoxide compound is generally conducted in a hydrocarbon solvent under an inert atmosphere. Non-limiting examples of suitable solvents include toluene, heptane, hexane, octane and the like. In this halogenating step, the mole ratio of metal alkoxide to halogenating agent is generally in the range of about 6:1 to about 1:3, can be in the range of about 3:1 to about 1:2, can be in the range of about 2:1 to about 1:2, and can also be about 1:1.

The halogenating step is generally carried out at a temperature in the range of about 0° C. to about 100° C. and for a reaction time in the range of about 0.5 to about 24 hours. The halogenating step can be carried out at a temperature in the range of about 20° C. to about 90° C. and for a reaction time in the range of about 1 hour to about 4 hours.

Once the halogenating step is carried out and the metal alkoxide is halogenated, the halide product "A" can be subjected to two or more halogenating/titanating treatments.

The halogenation/titanation agents utilized can be blends of two tetra-substituted titanium compounds with all four substituents being the same and the substituents being a halide or an alkoxide or phenoxide with 2 to 10 carbon atoms, such as $TiCl_4$ or $Ti(OR'''')_4$. The halogenation/titanation agent utilized can be a chlorination/titanation agent.

The halogenation/titanation agent may be a single compound or a combination of compounds. The method provides an active catalyst after the first halogenation/titanation; however, there are desirably a total of at least three halogenation/titanation steps.

The first halogenation/titanation agent is typically a mild titanation agent, which can be a blend of a titanium halide and an organic titanate. The first halogenation/titanation agent can be a blend of $TiCl_4$ and $Ti(OBu)_4$ in a range from 0.5:1 to 6:1 $TiCl_4/Ti(OBu)_4$, the ratio can be from 2:1 to 3:1 ("OBu" represents butoxide). It is believed that the blend of titanium halide and organic titanate react to form a titanium alkoxyhalide, $Ti(OR)_aX_b$, where OR and X are alkoxide and halide, respectively and a+b is the valence of titanium, which is typically 4.

In the alternative, the first halogenation/titanation agent may be a single compound. Examples of a first halogenation/titanation agent are $Ti(OC_2H_5)_3Cl$, $Ti(OC_2H_5)_2Cl_2$, $Ti(OC_3H_7)_2$, $Ti(OC_3H_7)_3Cl$, $Ti(OC_4H_9)Cl_3$, $Ti(OC_6H_{13})_2Cl_2$, $Ti(OC_2H_5)_2Br_2$, and $Ti(OC_{12}H_5)Cl_3$.

The first halogenation/titanation step is generally carried out by first slurrying the halogenation product "A" in a hydrocarbon solvent at room temperature/ambient temperature. No limiting examples of suitable hydrocarbons solvent include heptane, hexane, toluene, octane and the like. The product "A" can be at least partially soluble in the hydrocarbon solvent.

A solid product "B" is precipitated at room temperature following the addition of the halogenation/titanation agent to the soluble product "A". The amount of halogenation/titanation agent utilized must be sufficient to precipitate a solid product from the solution. In general, the amount of halogenation/titanation agent utilized, based on the ratio of titanium to metal, will generally be in the range of about 0.5 to about 5, typically in the range of about 1 to about 4, and can be in the range about 1.5 to about 2.5. An example is $TiCl_4$/titanium (IV) butoxide (TNBT).

The solid product "B" precipitated in this first halogenation/titanation step is then recovered by any suitable recovery technique, and then washed at room/ambient temperature with a solvent, such as hexane. Generally, the solid product "B" is washed until the [Ti] is less than about 100 mmol/L. Within the method [Ti] represents any titanium species capable of acting as a second generation Ziegler catalyst, which would comprise titanium species that are not part of the reaction products as described herein. The resulting product "B" is then subjected to a second and third halogenating/titanating steps to produce products "C" and "D". After each halogenating/titanating step the solid product can be washed until the [Ti] is less than a desired amount. For example, less than about 100 mmol/L, less than about 50 mmol/L, or less than about 10 mmol/L. After the final halogenating/titanating step, the product can be washed until the [Ti] is less than a desired amount, for example, less than about 20 mmol/L, less than about 10 mmol/L, or less than about 1.0 mmol/L. It is believed that a lower [Ti] can produce improved catalyst results by reducing the amount of titanium that can act as a second generation Ziegler species. It is believed that a that a lower [Ti] can be a factor in producing improved catalyst results such as a narrower MWD.

The second halogenation/titanation step is generally carried out by slurrying the solid product recovered from the first titanation step, solid product "B", in a hydrocarbon solvent. Hydrocarbon solvents listed as suitable for the first halogenation/titanation step may be utilized. The second and third halogenation/titanation steps can utilize a different compound or combination of compounds from the first halogenation/titanation step. The second and third halogenation/titanation steps can utilize the same agent at a concentration that is stronger than that used in the first halogenation/titanation agent, but this is not a necessity. The second and third halogenating/titanating agents can be a titanium halide, such as titanium tetrachloride ($TiCl_4$). The halogenation/titanation agent is added to the slurry. The addition can be carried out at ambient/room temperature, but can also be carried out at temperatures and pressures other than ambient.

Generally, the second and third halogenation/titanation agents comprise titanium tetrachloride. Typically the second and third halogenation/titanation steps each comprise a titanium to magnesium ratio in a range of about 0.1 to 5, a ratio of about 2.0 can also be used, and a ratio of about 1.0 can be used. The third halogenation/titanation step is generally carried out at room temperature and in a slurry, but can also be carried out at temperatures and pressures other than ambient.

The amount of titanium tetrachloride utilized, or alternate halogenation/titanation agent, may also be expressed in terms of equivalents, an equivalent herein is amount of titanium relative to the magnesium or metal compound. The amount of titanium of each of the second and third halogenating/titanating steps will generally be in the range of about 0.1 to about 5.0 equivalents, can be in the range of about 0.25 to about 4 equivalents, typically is in the range of about 0.3 to about 3 equivalents, and it can be desirable to be in the range of about 0.4 to about 2.0 equivalents. In one particular embodiment, the amount of titanium tetrachloride utilized in each of the second and third halogenation/titanation steps is in the range of about 0.45 to about 1.5 equivalent.

The catalyst component "D" made by the above described process may be combined with an organometallic catalyst component (a "preactivating agent") to form a preactivated catalyst system suitable for the polymerization of olefins. Typically, the preactivating agents which are used together with the transition metal containing catalyst component "D" are organometallic compounds such as aluminum alkyls, aluminum alkyl hydrides, lithium aluminum alkyls, zinc alkyls, magnesium alkyls and the like. Preferably, the preactivating agent is selected from the group consisting of trialkylaluminums, dialkylaluminum halides, and alkylaluminum dihalides.

The preactivating agent is preferably an organoaluminum compound. The organoaluminum preactivating agent is typically an aluminum alkyl of the formula $AlR_3$ wherein at least one R is an alkyl having 1-8 carbon atoms or a halide, and wherein each of the R may be the same or different. Suitable preactivating agents include trialkyl aluminum such as, for example, trimethyl aluminum (TMA), triethylaluminum (TEAL), triisobutylaluminum (TIBAL) and also include diethylaluminum chloride, triisobutylaluminum chloride, butylaluminum dichloride, and the like, and mixtures thereof. The organoaluminum preactivating agent is more preferably trimethyl aluminum (TMA), triethyl aluminum (TEAL), triisobutyl aluminum (TIBAL) or mixtures thereof. Preferably, the preactivating agent is TEAL, since with TEAL the molecular weight distribution (MWD) of the bimodal polyethylene prepared in the two reactors in series is even wider than when using other organoaluminum preactivating agents. Generally, when using TEAL as the preactivating agent the MWD will be at least 5, preferably at least 6.

In general, the ratio of Al to titanium can be in the range from 0.1:1 to 2:1 and typically is 0.25:1 to 1.2:1.

Optionally, the Ziegler-Natta catalyst may be pre-polymerized. Generally, a prepolymerization process is affected by contacting a small amount of monomer with the catalyst after the catalyst has been contacted with the preactivating agent. A prepolymerization process is described in U.S. Pat. Nos. 5,106,804; 5,153,158; and 5,594,071, hereby incorporated by reference.

Optionally, an electron donor may be added with the halogenation agent, the first halogenation/titanation agent, or the subsequent halogenation/titanation agent or agents. It may be desirable to have an electron donor utilized in the second halogenation/titanation step. Electron donors for use in the preparation of polyolefin catalysts are well known, and any suitable electron donor may be utilized in the method that will provide a suitable catalyst. Electron donors, also known as Lewis bases, are organic compounds of oxygen, nitrogen, phosphorous, or sulfur which can donate an electron pair to the catalyst.

The electron donor may be a monofunctional or polyfunctional compound, can be selected from among the aliphatic or aromatic carboxylic acids and their alkyl esters, the aliphatic or cyclic ethers, ketones, vinyl esters, acryl derivatives, particularly alkyl acrylates or methacrylates and silanes. An example of a suitable electron donor is di-n-butyl phthalate. A generic example of a suitable electron donor is an alkylsilylalkoxide of the general formula $RSi(OR')_3$, e.g., methylsilyltriethoxide [$MeSi(OEt)_3$], where R and R' are alkyls with 1-5 carbon atoms and may be the same or different. ("OEt" represents "ethoxy")

For the polymerization process, an internal electron donor can be used in the synthesis of the catalyst and an external electron donor or stereoselectivity control agent (SCA) to activate the catalyst at polymerization. An internal electron donor may be used in the formation reaction of the catalyst during the halogenation or halogenation/titanation steps. Compounds suitable as internal electron donors for preparing conventional supported Ziegler-Natta catalyst components include ethers, diethers, ketones, lactones, electron donors compounds with N, P and/or S atoms and specific classes of esters. Particularly suitable are the esters of phthalic acid, such as diisobutyl, dioctyl, diphenyl and benzylbutylphthalate; esters of malonic acid, such as diisobutyl and diethylmalonate; alkyl and arylpivalates; alkyl, cycloalkyl and arylmaleates; alkyl and aryl carbonates such as diisobutyl, ethyl-phenyl and diphenylcarbonate; succinic acid esters, such as mono and diethyl succinate.

External donors which may be utilized in the preparation of a catalyst include organosilane compounds such as alkoxysilanes of general formula $SiR_m(OR')_{4-m}$, where R is selected from the group consisting of an alkyl group, a cycloalkyl group, an aryl group and a vinyl group; R' is an alkyl group; and m is 0-3, wherein R may be identical with R'; when m is 0, 1 or 2, the R' groups may be identical or different; and when m is 2 or 3, the R groups may be identical or different.

The external donor of the method can be selected from a silane compound of the following formula: wherein $R_1$ and $R_4$ are both an alkyl or cycloalkyl group containing a primary, secondary or tertiary carbon atom attached to the silicon, $R_1$ and $R_4$ being the same or different; $R_2$ and $R_3$ are alkyl or aryl groups. $R_1$ may be methyl, isopropyl, cyclopentyl, cyclohexyl or t-butyl; $R_2$ and $R_3$ may be methyl, ethyl, propyl, or butyl groups and not necessarily the same; and $R_4$ may also methyl, isopropyl, cyclopentyl, cyclohexyl or t-butyl. Specific external donors are cyclohexylmethyldimethoxy silane (CMDS), diisopropyldimethoxysilane (DIDS) cyclohexylisopropyl dimethoxysilane (CIDS), dicyclopentyldimethoxysilane (CPDS) or di-t-butyl dimethoxysilane (DTDS).

Preferably, the preactivating agent is an organoaluminium compound, preferably of the formula $AlR_3$, wherein R is an alkyl having 1-8 carbon atoms or a halide, and wherein each R may be the same or different. More preferably, the organoaluminium compound is TEAL.

Preferably, the halogenating agent is $ClTi(OPr)_3$. Preferably, the first halogenating/titanating agent a mixture of $TiCl_4$ and $Ti(OBu)_4$, in a molar ratio range of from 0.5:1 to 6:1 of $TiCl_4/Ti(OBu)_4$. More preferably the molar ratio is 2:1 of $TiCl_4/Ti(OBu)_4$. Preferably, the second halogenating/titanating agent is $TiCl_4$. Preferably, the third halogenating/titanating agent is also $TiCl_4$.

According to the present invention, the Ziegler-Natta catalyst used for the production of said first polyethylene resin has an average particle size (D50) of at most 15 µm, with the D50 being measured by laser diffraction analysis on a Malvern type analyzer.

Ziegler Natta catalyst having an average particle size (D50) of at most 15 µm can be prepared as described herein above. Other suitable Ziegler Natta catalysts of average particle size (D50) of at most 15 µm can be commercially available from W. R. Grace and Company, such as SYLOPOL®5910 which has an average particle size of 10 µm, or from Lyondellbasell.

The catalyst is preferably added to the loop reactor as a catalyst slurry. As used herein, the term "catalyst slurry" refers to a composition comprising catalyst solid particles and a diluent. The solid particles can be suspended in the diluent, either spontaneously or by homogenization techniques, such as mixing. The solid particles can be non-homogeneously distributed in a diluent and form a sediment or deposit.

Optionally, activating agent is used in processes according to the invention. The term "activating agent" refers to materials that can be used in conjunction with a catalyst in order to improve the activity of the catalyst during the polymerization reaction. In the present invention, it particularly refers to an organo-aluminium compound, being optionally halogenated, having general formula $AlR^{11}R^{12}R^{13}$ or $AlR^{11}R^{12}Y$ wherein $R^{11}$, $R^{12}$, $R^{13}$ is an alkyl having from 1 to 6 carbon atoms and $R^{11}$, $R^{12}$, $R^{13}$ may be the same or different and wherein Y is hydrogen or a halogen, as disclosed in U.S. Pat. No. 6,930,071 and U.S. Pat. No. 6,864,207, which are incorporated herein by reference. Preferred activating agents are Tri-Ethyl Aluminum (TEAl), Tri-Iso-Butyl Aluminum (TIBAl), Tri-Methyl Aluminum (TMA), and Methyl-Methyl-Ethyl Aluminum (MMEAl). TEAl is particularly preferred. In an embodiment, the activating agent is added to the loop reactor in an activating agent slurry at a concentration of less than 90% by weight of the activating agent slurry composition, more preferably from 10 to 50% by weight, for instance around 20% by weight. Preferably, the concentration of the activating agent in the loop reactor is lower than 200 ppm, more preferably from 10 to 100 parts per million, most preferably from 20-70 ppm and for instance around 50 ppm.

As used herein, the term "monomer" refers to olefin compound that is to be polymerized. Examples of olefin monomers are ethylene and propylene. Preferably, the invention is directed to ethylene.

As used herein, the term "diluent" refers to diluents in a liquid state, liquid at room temperature and preferably liquid under the pressure conditions in the loop reactor. Diluents which are suitable for being used in accordance with the present invention may comprise but are not limited to hydrocarbon diluents such as aliphatic, cycloaliphatic and aromatic hydrocarbon solvents, or halogenated versions of such solvents. The preferred solvents are C12 or lower, straight chain or branched chain, saturated hydrocarbons, C5 to C9 saturated alicyclic or aromatic hydrocarbons or C2 to C6 halogenated hydrocarbons. Non-limiting illustrative examples of solvents are butane, isobutane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane. In a preferred embodiment of the present invention, said diluent is isobutane. However, it should be clear from the present invention that other diluents may as well be applied according to the present invention.

Suitable ethylene polymerization includes but is not limited to homopolymerization of ethylene, copolymerization of ethylene and a higher 1-olefin co-monomer.

As used herein, the term "co-monomer" refers to olefin co-monomers which are suitable for being polymerized with ethylene monomers. Co-monomers may comprise but are not limited to aliphatic C3-C20 alpha-olefins. Examples of suitable aliphatic C3-C20 alpha-olefins include propylene, 1-butene, 1-pentene, 4-methyl-1-pentene, 1-hexene, 1-octene, 1-decene, 1-dodecene, 1-tetradecene, 1-hexadecene, 1-octadecene and 1-eicosene. The term "co-polymer" refers to a polymer, which is made by linking two different types of in the same polymer chain. The term "homopolymer" refers to a polymer which is made by linking ethylene monomers, in the absence of co-monomers. In an embodiment of the present invention, said co-monomer is 1-hexene.

In a preferred embodiment, reactants comprising the monomer ethylene, isobutane as hydrocarbon diluent, a catalyst, the co-monomer 1-hexene are used.

The polymerization can be performed over a wide temperature range. Preferably, the temperature is within the range of about 0° C. to about 110° C. A more preferred range is from about 60° C. to about 100° C., more preferably from about 80 to 110° C.

The reactor pressure is preferably held between 20 and 100 bar, 30 to 50 bar, more preferably at pressure of 37 to 45 bar. In an embodiment, the slurry flow can be set between 5 and 15 m/s.

The invention allows for preparation of homogeneous multimodal polyethylene products comprising a HMW fraction by physical blending. The polyethylene product of the invention can be easily produced under flexible processing conditions, while leading to homogeneous pelleted polyethylene product. The method provides advantages such as easy mixing; and ease of processing. The invention allows preparing polyethylene products with tailor made properties.

The following non-limiting example illustrates the invention.

Example

Two bimodal polyethylene resins were produced by physically melting and blending together 50% by weight of HMW polyethylene fluff and 50% by weight of a LMW polyethylene fluff.

HMW polyethylene fluff was produced in a single loop reactor in the presence of a ZN catalyst using the conditions listed in table 1.

LMW polyethylene fluff was produced in a single loop reactor in the presence of a ZN catalyst using the conditions listed in table 1.

The catalysts used were Avant Z 202-S, a Ziegler-Natta catalyst having an average particle size distribution $d_{50}$ of 23 µm purchased from Lyondellbasell and Avant Z 202-VS, a Ziegler-Natta catalyst having an average particle size distribution $d_{50}$ of 13 µm purchased from Lyondellbasell.

TABLE 1

| Rector conditions and Properties fluff | Units | EF2235A HMW | EF2235B HMW | EF2234 LMW |
|---|---|---|---|---|
| Catalyst average particle diameter | µm | 13 | 23 | 23 |

TABLE 1-continued

| Rector conditions and Properties fluff | Units | EF2235A HMW | EF2235B HMW | EF2234 LMW |
|---|---|---|---|---|
| Throughput | Kg/h | 2115 | 1893 | 2304 |
| Slurry density | g/cm$^3$ | 0.58 | 0.549 | 0.582 |
| Reactor temperature | ° C. | 80 | 80 | 95 |
| Solid % | % | 36 | 27.3 | 45 |
| productivity | g PE/g catalyst | 9000 | 7262 | 17500 |
| Legs in use | units | 3 | 3 | 2 |
| Pump power | kw | 175 | 211 | 170 |
| HL275 | g/10 min | 0.789 | 0.79 | |
| MI$_5$ | g/10 min | | | 60 |
| Density fluff | Kg/l | 0.9252 | 0.9247 | 0.9685 |

HL275 was measured according to ASTM D 1238 at a temperature of 190° C. and under a load of 21.6 kg, except that a die of 2.75 mm broad instead of 2.05 mm was used. HLMI=HL275/3.2. MI$_5$ was measured at 190° C. under a 5 kg load according ASTM D-1238.

The extrusion of the blends was performed in Total Petrochemicals Antwerp. ER2235A was obtained by extruding EF2235A, with EF2234, and ER2235B was obtained by extruding EF2235B with EF2234.

The properties of the obtained bimodal resins are shown in Table 2. White spot area was measured as described herein: A sample of the resin is analyzed by first obtaining microtome cuts of different parts of the sample (thickness <60 micrometer, diameter 3 to 5 mm).

The cuts are evaluated at a magnification of 100, and the size, i.e. the part of the surface, of the non-colored inclusions ("white spots", agglomerates, particles) on a total surface of each cut of 0.7 mm$^2$ is determined. All white spots with a diameter >5 microns are counted. The "white spot area" is then expressed as the averaged fraction of the white spots on the total surface of the sample cut.

TABLE 2

| | Units | ER2235A | ER2235B |
|---|---|---|---|
| HMW/LMW | ratio | 1 | 1 |
| Specific energy | kW..h/T | 271 | 277 |
| Density | Kg/l | 0.9499 | 0.9498 |
| HLMI | g/10 min | 8.44 | 8.23 |
| Throughput | T/h | 7.75 | 7.75 |
| Power consumption Main motor | kW | 2100 | 2146 |
| Average White spot area | % | 0.64 | 1.8 |

The bimodal resin obtained using HMW fluff produced with 13 μm ZN catalyst had a very good polymer homogeneity. It was not possible to reach good homogeneity of the bimodal ER2235B product, as seen on the white spot area measurement.

The invention claimed is:

1. A process for preparing a multimodal polyethylene product, said multimodal polyethylene product comprising at least two different polyethylene resins, the process comprising:
   (a) producing a first polyethylene resin in the presence of a Ziegler-Natta catalyst in a reactor;
   (b) separately producing a second polyethylene resin in the presence of a Ziegler-Natta catalyst; and
   (c) physically blending together said first polyethylene resin and said second polyethylene resin to produce the multimodal polyethylene product, wherein the physical blending is performed in a device adapted to continuously melt and blend the first polyethylene resin and the second polyethylene resin;
   wherein the Ziegler-Natta catalyst used for the production of said first polyethylene resin has an average particle size (D50) of at most 15 μm, with the D50 being measured by laser diffraction analysis on a Malvern type analyzer.

2. The process of claim 1, wherein the device is an extruder, a mixer, or combinations thereof.

3. The process of claim 1, wherein the Ziegler-Natta catalyst used for the production of said first polyethylene resin has an average particle size (D50) of at most 13 μm, with the D50 being measured by laser diffraction analysis on a Malvern type analyzer.

4. The process of claim 1, wherein the Ziegler-Natta catalyst used for the production of said first polyethylene resin has an average particle size (D50) of at most 10 μm, with the D50 being measured by laser diffraction analysis on a Malvern type analyzer.

5. The process of claim 1, wherein the Ziegler-Natta catalyst used for the production of said first polyethylene resin has an average particle size (D50) of at most 8 μm, with the D50 being measured by laser diffraction analysis on a Malvern type analyzer.

6. The process of claim 1, wherein the Ziegler-Natta catalyst used for the production of said first polyethylene resin has an average particle size (D50) of at most 5 μm, with the D50 being measured by laser diffraction analysis on a Malvern type analyzer.

7. The process of claim 1, wherein the Ziegler-Natta catalyst used for the production of said first polyethylene resin has an average particle size (D50) of at least 3 μm, with the D50 being measured by laser diffraction analysis on a Malvern type analyzer.

8. The process of claim 1, wherein a weight ratio of the first polyethylene resin to the second polyethylene resin is between 0.20 and 5.

9. The process of claim 1, wherein the multimodal polyethylene product comprises at least 10% by weight of the first polyethylene resin based on a total weight of the multimodal polyethylene product.

10. The process of claim 1, wherein the multimodal polyethylene product comprises at most 90% by weight of the first polyethylene resin based on a total weight of the multimodal polyethylene product.

11. The process of claim 1, wherein the multimodal polyethylene product comprises at least 10% by weight of the second polyethylene resin based on a total weight of the multimodal polyethylene product.

12. The process of claim 1, wherein the multimodal polyethylene product comprises at most 90% by weight of the second polyethylene resin based on a total weight of the multimodal polyethylene product.

13. The process of claim 1, wherein the High Load Melt Index (HLMI) of said multimodal polyethylene product is between 2 and 75 g/10 min., with the HLMI being measured by the procedure of ASTM D-1238 using a temperature of 190° C. and a load of 21.6 kg.

14. The process of claim 1, wherein the density of said multimodal polyethylene product is between 0.935 and 0.965 g/cm$^3$, with the density being determined with the ASTM D-1505 standardized test at a temperature of 23° C.

15. The process of claim 1, wherein the first polyethylene resin has a monomodal molecular weight distribution.

16. The process of claim 1, wherein the second polyethylene resin has a monomodal molecular weight distribution.

\* \* \* \* \*